US007030334B1

(12) United States Patent
Ruiz et al.

(10) Patent No.: US 7,030,334 B1
(45) Date of Patent: Apr. 18, 2006

(54) METHOD OF DIAGNOSING DEGRADATION OF A WELDING SYSTEM

(75) Inventors: Daniel Ruiz, Valencia (ES); Juan Martinez, Valencia (ES); Jose Luis Perez Guerrero, Valencia (ES); M. Segrelles Munoz, Valencia (ES); Marivi Alonso Ortiz, Valencia (ES)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/907,063

(22) Filed: Mar. 18, 2005

(51) Int. Cl.
*B23K 11/25* (2006.01)

(52) U.S. Cl. .................................................... 219/109

(58) Field of Classification Search ................ 219/109, 219/110
See application file for complete search history.

(56) References Cited

U.S. PATENT DOCUMENTS

| | | | | |
|---|---|---|---|---|
| 3,932,725 | A | | 1/1976 | Ganowski |
| 4,647,751 | A | * | 3/1987 | Yoshimura et al. ......... 219/109 |
| 4,734,640 | A | | 3/1988 | Kitahori et al. |
| 4,973,813 | A | * | 11/1990 | Mitchell ..................... 219/109 |
| 5,406,045 | A | | 4/1995 | Kiriishi et al. |
| 5,637,241 | A | * | 6/1997 | Moates ....................... 219/106 |
| 5,866,866 | A | | 2/1999 | Shimada |
| 5,938,947 | A | | 8/1999 | Takano et al. |
| 6,342,686 | B1 | | 1/2002 | Farrow |

* cited by examiner

*Primary Examiner*—Clifford C. Shaw
(74) *Attorney, Agent, or Firm*—Raymond L. Coppiellie; Brooks & Kushman, P.C.

(57) ABSTRACT

A method of diagnosing electrical degradation of a welding system. The method includes determining whether a predetermined number of welds has been executed, positioning welding electrodes, applying and measuring current applied through the electrodes, and comparing the measured current to a threshold value.

20 Claims, 2 Drawing Sheets

METHOD OF DIAGNOSING DEGRADATION OF A WELDING SYSTEM

BACKGROUND OF THE INVENTION

1. Field of the Invention

The present invention relates to a method of diagnosing degradation of a welding system, and more particularly to a method of diagnosing electrical degradation of a welding system used in a vehicle manufacturing process.

2. Background Art

Welding systems are used to weld metal components together in vehicle assembly operations. A welding system may adjust current output to compensate for resistance variations in an electrical welding circuit. Resistance variations may be related to the workpieces being welded or the degradation of welding system equipment.

Previously, welding systems were unable to distinguish between resistance variations associated with workpieces, such as contamination or improper positioning, and resistance variations due to the equipment degradation. As a result, equipment degradation was not diagnosed until unexpected equipment failure occurred, resulting in downtime and reduced productivity.

Before Applicant's invention, there was a need for a method that accurately diagnosed degradation of a welding system. In addition, there was a need for a method that detected and signaled the deterioration of welding system components prior to failure. In addition, there was a need for a diagnostic method that was sensitive to resistance variations caused by equipment degradation. In addition, there was a need for a method that could be automated and implemented without increasing cycle time or decreasing equipment availability. In addition, there was a need for a method that could be integrated with vehicle assembly operations. Problems associated with the prior art as noted above and other problems are addressed by applicant's invention as summarized below.

SUMMARY OF THE INVENTION

According to one aspect of the present invention, a method of diagnosing electrical degradation of a welding system is provided. The welding system includes a weld gun having a set of electrodes, an actuator for positioning at least one member of the set of electrodes, and a power source.

The method includes the steps of determining whether a predetermined number of welds has been executed, positioning at least one member of the set of electrodes a predetermined distance from another member of the set of electrodes if the predetermined number of welds has been executed, applying current with the power source through the set of electrodes, measuring the current applied through the set of electrodes, comparing the current applied to a threshold value, and generating a pass signal if the current applied is greater than the threshold value. This method permits degradation of welding system components to be detected and diagnosed independent of workpiece attributes to prevent welding system failures, prevent degradation in weld quality, and improve productivity.

The method may include the step of generating a fail signal if the current applied through the set of electrodes is less than the threshold value. The fail signal may be used to stop a vehicle body assembly line.

The method may include resetting a counter indicative of a number of welds that has been executed.

The step of positioning the set of electrodes may include positioning one or more electrodes a predetermined distance apart from each other.

According to another aspect of the present invention, a method of diagnosing electrical degradation of a welding system is provided. The welding system includes a weld gun having a set of electrodes, an actuator for positioning at least one member of the set of electrodes, and a power source.

The method includes the steps of determining whether a predetermined number of welds has been executed, positioning at least one member of the set of electrodes proximate another member of the set of electrodes, applying current with the power source, measuring the current applied through the set of electrodes, comparing the current applied to a threshold value, and generating a pass signal if the current applied is greater than a threshold value.

The set of electrodes may include first and second electrodes. The step of positioning the set of electrodes may include actuating the first electrode with the actuator to position the first electrode proximate the second electrode. The step of positioning the set of electrodes may include actuating first and second electrodes such that the first and second electrodes are proximate each other. The first and second electrodes may be held in compression at a constant level of force.

According to another aspect of the present invention, a method of diagnosing electrical degradation of a robot-mounted welding system for a vehicle assembly line is provided. The welding system includes a weld gun having first and second electrodes.

The method includes the steps of determining whether a predetermined number of welds has been executed, positioning the welding gun away from a workpiece with the robot, positioning the first and second electrodes proximate each other if the predetermined number of welds has been executed, applying current through the first and second electrodes, measuring the current applied through the first and second electrodes, comparing the current applied through the first and second electrodes to a threshold range, and generating a pass signal if the current applied through the first and second electrodes is within the threshold range.

The method may include the step of generating a fail signal if the current applied through the first and second electrodes is not within the threshold range. The fail signal may be provided to a vehicle assembly line controller and/or may be used to power an indicator that produces an audible or visible signal.

DETAILED DESCRIPTION OF THE PREFERRED EMBODIMENT(S)

Figure 1:
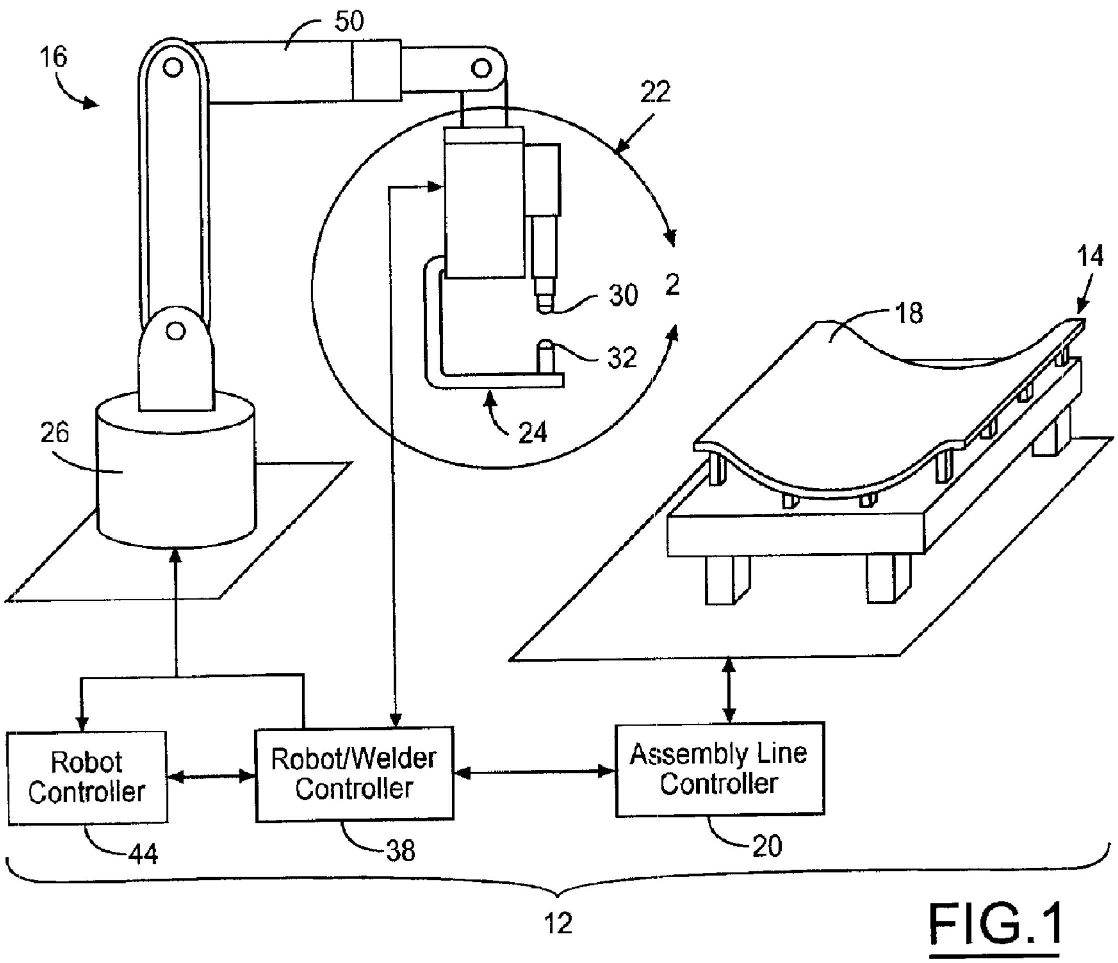
FIG. 1 is a schematic of a portion of a vehicle assembly line having a welding system.

Referring to FIG. 1, a portion of a vehicle assembly line 10 is shown. The vehicle assembly line 10 may include one or more flexible work cells, such as a welding work cell 12, for assembling the body of an automotive vehicle. Each work cell may include a workpiece presenter 14 and processing tool 16.

The workpiece presenter 14 may be of any suitable type, such as a fixture adapted to hold a workpiece 18 in a predetermined position. The workpiece presenter 14 may be stationary or may be integrated with a material handling system that moves the workpiece presenter 14 between a plurality of work cells.

The assembly line 10 may also include an assembly line controller 20 that controls the operation of one or more assembly line components. For example, the assembly line controller may coordinate the operation of material handling equipment, such as a conveyor system or material handling robot.

The processing tool 16 may be of any suitable type. In the embodiment shown, the processing tool 16 includes a welding system 22 having a weld gun assembly 24 configured to be attached to a manipulator 26.

Figure 2:
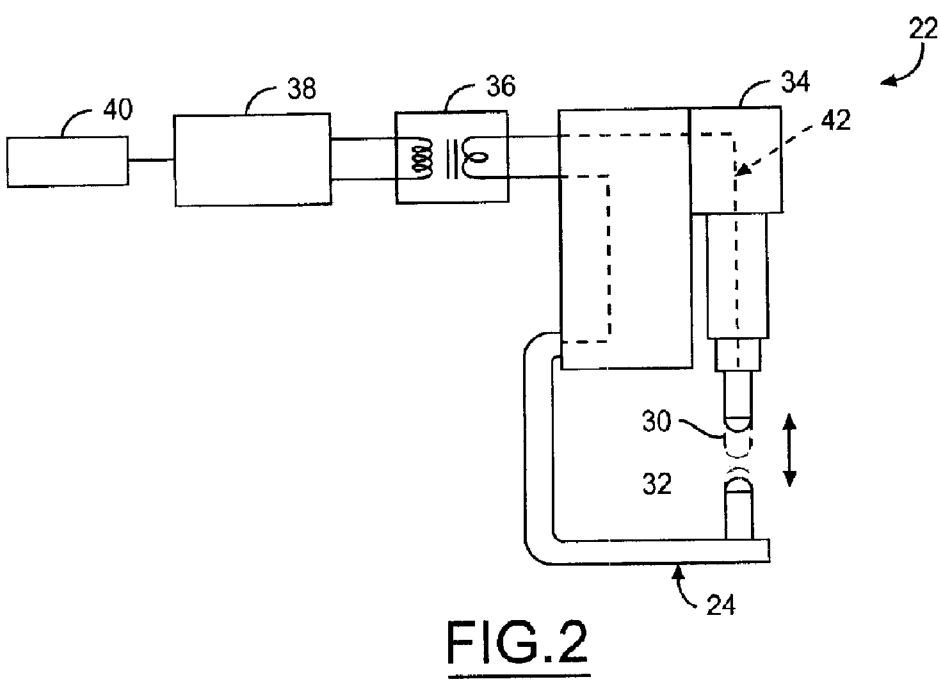
FIG. 2 is a schematic of the exemplary welding system shown in FIG. 1.

Referring to FIG. 2 the weld gun assembly 24 is shown in more detail. The weld gun assembly 24 may be configured to engage and weld one or more workpieces together. The weld gun assembly 24 may have any suitable configuration. In the embodiment shown, the weld gun assembly 24 includes a first electrode 30, a second electrode 32, and one or more actuators 34.

The first and second electrodes 30,32 may be of any suitable type and may have any suitable configuration. In addition, the first and second electrodes 30,32 may be associated with one or more actuators 34 that facilitate movement. More particularly, the first and/or second electrodes 30,32 may be adapted to move relative to each other. In one embodiment, either the first electrode 30 or second electrode 32 is attached to an actuator. Alternatively, both the first and second electrodes 30,32 may be attached to an actuator or actuators to facilitate movement. The actuator 34 may be of any suitable type, such as a pneumatic or hydraulic cylinder actuator.

The welding system 22 also includes a power source 36, and a controller 38. Optionally, the welding system 22 may include one or more indicators 40.

The power source 36, which may be a transformer, is adapted to provide sufficient electrical current to the electrodes 30, 32 to facilitate welding. The power source 36 may be disposed near the electrodes 30,32 or may be disposed in a remote location.

In the embodiment shown in FIG. 2, the power source 36 and electrodes 30,32 cooperate to define at least a portion of a welding electrical circuit 42. In the embodiment shown, current flows from the first electrode 30 to the second electrode 32 when the electrodes engage the workpiece 18 or are positioned in a manner to close the circuit.

The controller 38 is adapted to monitor and control execution of a weld. For example, the controller 38 may control operation of the power source 36. The controller 38 may be remotely located and may be integrated with one or more other controllers, such as a controller 44 that monitors and controls operation of the manipulator 26. The controllers 20,38,44 may be configured to communicate with each other as shown in FIG. 1.

The one or more indicators 40 may be of any suitable type. The indicator 40 may provide audible and/or visual feedback. For example, the indicator 40 may be a light or buzzer.

The manipulator 26 may have any suitable configuration. In the embodiment shown in FIG. 1, the manipulator 26 is configured as a multi-axis robot having a manipulator arm 50. The manipulator 26 may be of any suitable type and may have any suitable number of movement axes and/or degrees of freedom.

Figure 3:
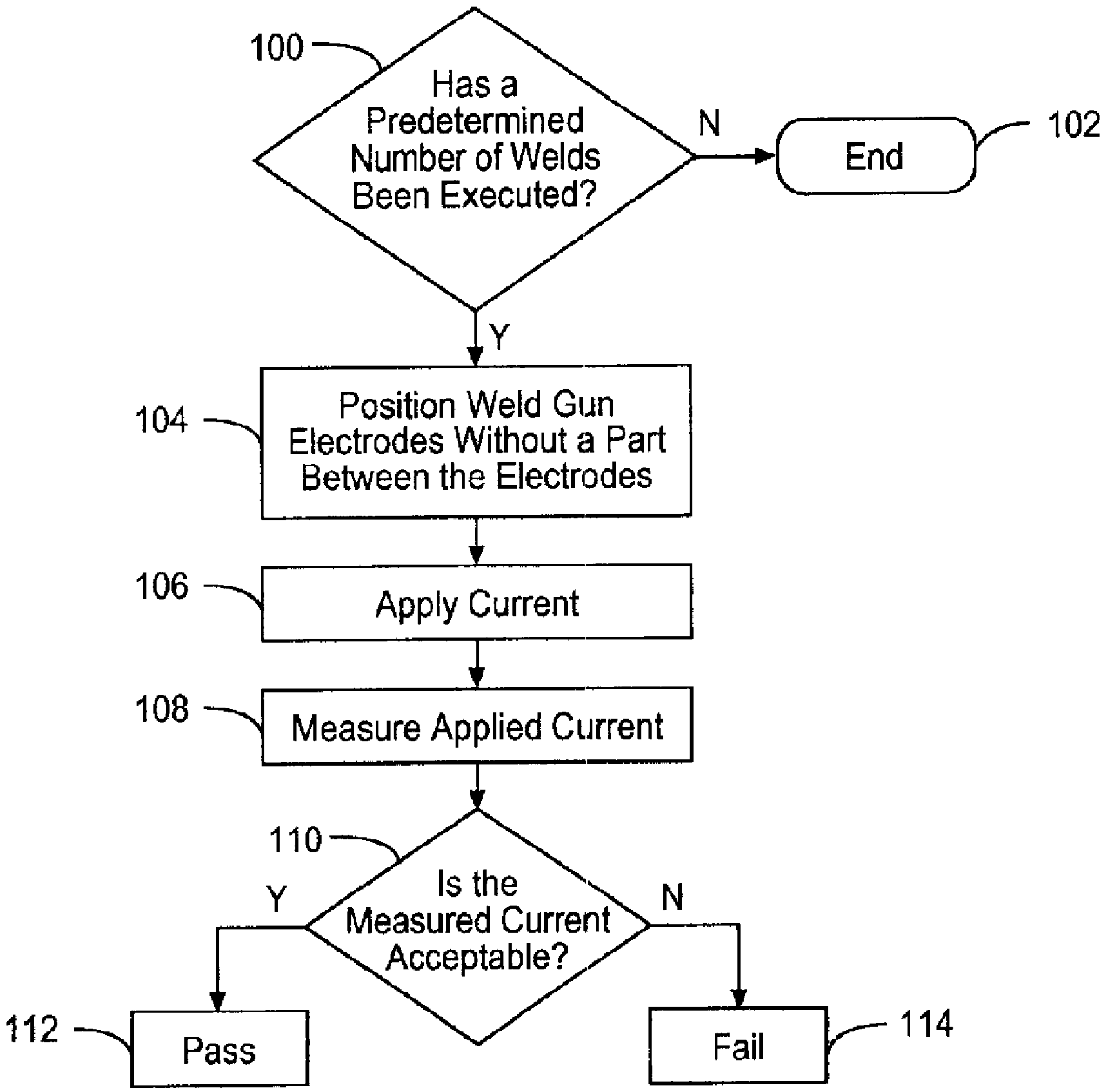
FIG. 3 is a flowchart of a method of diagnosing electrical degradation of the welding system.

Referring to FIG. 3, a flowchart of a method of diagnosing electrical degradation of a welding system is shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by determining whether a predetermined number of welds has been executed. A counter may be used to count the number of welds executed by the welding system. The predetermined number of welds may be any suitable amount, such as between 25 and 100 welds, and may be based on experimentation. In one exemplary embodiment, the predetermined number of welds is set at 50. If the predetermined number of welds has not been executed, then the method continues at block 102 where the method ends. If the predetermined number of welds has been executed, then the method continues at block 104.

At 104, the method positions the weld gun electrodes. More particularly, the electrodes are positioned at a predetermined location without a workpiece disposed between the electrodes. Positioning of the electrodes may be accomplished by actuating one or more electrodes as previously described so that the electrodes are positioned near or proximate each other to facilitate current flow. If the electrodes are positioned in contact with each other they may be held in compression at a constant level of force.

At 106, current is applied through the electrodes. More specifically, the power source or transformer is energized and current flows through the welding electrical circuit, similar to when a weld is executed. The current provided may be a constant amount and may be set at a level equal to or different from the level of current provided when executing a weld. In addition, the counter used to measure the number of welds executed may be reset to zero as part of this step. Alternatively, the counter may be reset in conjunction with positioning the weld gun electrodes in block 104 or as part of any subsequent step of the method.

At 108, the method continues by measuring the current applied. The current may be measured in any suitable manner, such as with an ampmeter or other current measuring device disposed in the welding electrical circuit. The measuring device may be disposed in any suitable location, such as proximate the secondary loop of the transformer.

At 110, the method determines whether the measured current is acceptable. More specifically, the method compares the current measured in block 108 to a threshold value or a threshold range. The threshold value or threshold range may be determined through experimentation or quantitative analysis that accounts for the electrical conductivity characteristics of the welding system. For example, the threshold value or threshold range may be established after measuring the current level in a welding system having components that have not experienced little degradation. Since a workpiece is not present when the current is applied, any decrease in current from an initial or baseline amount may be due to an increase in the resistance (i.e., deterioration) of one or more welding system components. If the measured current is greater than the threshold value or is within the threshold range, then the level of current and any degradation of welding system components is acceptable and the method continues at block 112. If the current is less than a threshold value or is not within the threshold range, then the level of current and degradation is not acceptable and the method continues at block 114.

At 112, a pass or acceptance signal is generated. The pass signal may be communicated to one or more indicators, such as light and/or controller(s) to permit operation to continue.

At 114, a fail signal is generated. The fail signal may be communicated to one or more indicators and/or controllers, such as a manipulator controller, welding system controller, and/or assembly line controller. The fail signal may be used to prevent additional welds from being executed until the operator intervenes to inspect the welding system. For example, the fail signal may be used by the manipulator and/or welding system controller to inhibit operation of the manipulator and/or welding system. Optionally, the fail signal may be communicated to the assembly line controller to inhibit operation of the assembly line. In addition, the fail signal may be used to control operation of an audible and/or visible indicator to alert the operator. The indicator may be associated with the work cell or assembly line.

The method of the present invention facilitates the early detection of electrical degradation of welding system components. As a result, welding system components may be replaced or repaired before other welding system components are damaged, thereby reducing maintenance costs. In addition, early detection permits welding system components to be reconditioned and reused, thereby reducing spare parts inventory costs. Furthermore, the present invention improves maintenance scheduling flexibility since the operator has the option of immediately making repairs or scheduling repairs during downtime, such as between production shifts. In addition, the method of the present invention improves weld quality and reduces scrap since degradation that may affect weld quality may be diagnosed and corrected before substandard welds are executed. Also, the method of the present invention does not impair station cycle time or operational efficiency since it may be executed between weld cycles, such as when workpieces are being transported. Moreover, the method of the present invention may be quickly and easily integrated with welding system and manipulator programming logic since no additional components are required.

While the best mode for carrying out the invention has been described in detail, those familiar with the art to which this invention relates will recognize various alternative designs and embodiments for practicing the invention as defined by the following claims.

What is claimed is:

1. A method of diagnosing electrical degradation of a welding system, the welding system including a weld gun having a set of electrodes, an actuator for positioning at least one member of the set of electrodes, and a power source, the method comprising:

determining whether a predetermined number of welds has been executed;

positioning at least one member of the set of electrodes a predetermined distance from another member of the set of electrodes if the predetermined number of welds has been executed;

applying current with the power source through the set of electrodes;

measuring the current applied through the set of electrodes;

comparing the current applied through the set of electrodes to a threshold value; and generating a pass signal if the current applied through the set of electrodes is greater than the threshold value.

2. The method of claim 1 further comprising the step of generating a fail signal if the current applied through the set of electrodes is less than the threshold value.

3. The method of claim 2 wherein the welding system is part of a vehicle body assembly line and the step of generating the fail signal further comprises stopping the vehicle body assembly line.

4. The method of claim 1 wherein the step of comparing the current applied further comprises resetting a counter indicative of a number of welds that has been executed.

5. The method of claim 1 wherein the set of electrodes includes first and second electrodes and the step of positioning the set of electrodes further comprises actuating the first electrode with the actuator to position the first electrode a predetermined distance from the second electrode.

6. The method of claim 1 wherein the set of electrodes includes first and second electrodes and the step of positioning the electrodes further comprises actuating the first and second electrodes to position the first and second electrodes a predetermined distance apart from each other.

7. A method of diagnosing electrical degradation of a welding system, the welding system including a weld gun having a set of electrodes, an actuator for positioning at least one member of the set of electrodes, and a power source, the method comprising:

determining whether a predetermined number of welds has been executed;

positioning at least one member of the set of electrodes proximate another member of the set of electrodes if the predetermined number of welds has been executed;

applying current with the power source through the set of electrodes;

measuring the current applied through the set of electrodes;

comparing the current applied through the set of electrodes to a threshold value; and generating a pass signal if the current applied through the set of electrodes is greater than the threshold value.

8. The method of claim 7 further comprising the step of generating a fail signal if the current applied through the set of electrodes is less than the threshold value.

9. The method of claim 8 wherein the welding system is part of a vehicle body assembly line and the step of generating the fail signal further comprises stopping the vehicle body assembly line.

10. The method of claim 7 wherein the step of applying current through the set of electrodes further comprises resetting a counter indicative of a number of welds that has been executed.

11. The method of claim 7 wherein the set of electrodes includes first and second electrodes and the step of positioning the set of electrodes further comprises actuating the first electrode with the actuator to position the first electrode proximate the second electrode.

12. The method of claim 11 wherein the first electrode is actuated against the second electrode and held in compression at a constant level of force.

13. The method of claim 7 wherein the set of electrodes includes first and second electrodes and the step of positioning the set of electrodes further comprises actuating the first and second electrodes to position the first and second electrodes proximate each other.

14. The method of claim 13 wherein the first and second electrodes are actuated against each other and held in compression at a constant level of force.

15. A method of diagnosing electrical degradation of a robot-mounted welding system for a vehicle assembly line, the welding system including a weld gun having first and second electrodes, the method comprising:

determining whether a predetermined number of welds has been executed;

positioning the welding gun away from a workpiece with a robot;

positioning the first and second electrodes proximate each other if the predetermined number of welds has been executed;

applying current through the first and second electrodes;

measuring the current applied through the first and second electrodes;

comparing the current applied through the first and second electrodes to a threshold range; and generating a pass signal if the current applied through the first and second electrodes is within the threshold range.

16. The method of claim 15 further comprising the step of generating a fail signal if the current applied through the first and second electrodes is not within the threshold range.

17. The method of claim 16 wherein the vehicle assembly line includes a controller and the step of generating the fail signal further comprises providing the fail signal to the controller to stop the vehicle assembly line.

18. The method of claim 16 wherein the step of generating the fail signal further comprises powering an indicator.

19. The method of claim 18 wherein the indicator produces a visible signal.

20. The method of claim 18 wherein the indicator produces an audible sound.

* * * * *